(12) United States Patent
Shimada

(10) Patent No.: US 10,079,104 B2
(45) Date of Patent: Sep. 18, 2018

(54) CAPACITOR

(71) Applicant: Murata Manufacturing Co., Ltd., Nagaokakyo-shi, Kyoto-fu (JP)

(72) Inventor: Yasuyuki Shimada, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/378,350

(22) Filed: Dec. 14, 2016

(65) Prior Publication Data

US 2017/0169951 A1 Jun. 15, 2017

(30) Foreign Application Priority Data

Dec. 15, 2015 (JP) ................. 2015-244084

(51) Int. Cl.
*H01G 4/30* (2006.01)
*H01G 4/008* (2006.01)
*H01G 4/012* (2006.01)
*H01G 4/22* (2006.01)
*H01G 4/224* (2006.01)
*H01G 4/236* (2006.01)
*H01G 4/232* (2006.01)
*H01G 4/12* (2006.01)

(52) U.S. Cl.
CPC ............. *H01G 4/30* (2013.01); *H01G 4/008* (2013.01); *H01G 4/012* (2013.01); *H01G 4/224* (2013.01); *H01G 4/232* (2013.01); *H01G 4/236* (2013.01); *H01G 4/12* (2013.01)

(58) Field of Classification Search
CPC .......... H01G 4/30; H01G 4/008; H01G 4/012; H01G 4/224; H01G 4/232; H01G 4/236; H01G 4/12

USPC ...................................................... 361/301.4
See application file for complete search history.

(56) References Cited

U.S. PATENT DOCUMENTS

| | | | |
|---|---|---|---|
| 2009/0086403 A1 | 4/2009 | Lee et al. | |
| 2009/0291317 A1 | 11/2009 | Kawasaki et al. | |
| 2014/0126106 A1 | 5/2014 | Sawada | |
| 2014/0204502 A1* | 7/2014 | Chun | H01G 4/30 361/301.4 |
| 2015/0014037 A1 | 1/2015 | Ahn et al. | |
| 2015/0109718 A1* | 4/2015 | Choi | H01G 2/06 361/304 |
| 2015/0243438 A1* | 8/2015 | Ahn | H01G 4/012 174/258 |

FOREIGN PATENT DOCUMENTS

| | | |
|---|---|---|
| CN | 101587775 A | 11/2009 |
| CN | 104576050 A | 4/2015 |
| JP | 2001-102243 A | 4/2001 |
| JP | 2001-155962 A | 6/2001 |

(Continued)

OTHER PUBLICATIONS

Official Communication issued in corresponding Chinese Patent Application No. 201611158536.1, dated May 2, 2018.

*Primary Examiner* — Michael P McFadden
(74) *Attorney, Agent, or Firm* — Keating & Bennett, LLP

(57) ABSTRACT

A capacitor includes an outer electrode extends over first and second main surfaces from exposed portions of inner electrodes on a first side surface and exposed portions of the inner electrodes on a second side surface. An outermost layer of the outer electrode includes a Cu-plated layer.

18 Claims, 13 Drawing Sheets

(56) References Cited

FOREIGN PATENT DOCUMENTS

| | | |
|---|---|---|
| JP | 2012-114457 A | 6/2012 |
| JP | 2014-112647 A | 6/2014 |
| KR | 10-2009-0032798 A | 4/2009 |
| KR | 10-2014-0038871 A | 3/2014 |

* cited by examiner even if the
CAPACITOR

CROSS REFERENCE TO RELATED APPLICATIONS

This application claims the benefit of priority to Japanese Patent Application No. 2015-244084 filed on Dec. 15, 2015. The entire contents of this application are hereby incorporated herein by reference.

BACKGROUND OF THE INVENTION

1. Field of the Invention

The present invention relates to a capacitor.

2. Description of the Related Art

In recent years, reduction in size and thickness of information terminal apparatuses such as a cellular phone and a portable music player has been advanced. With this, size reduction of a substrate that is mounted on an electronic apparatus such as a capacitor and electronic components that are mounted on the substrate has also been advanced. Furthermore, the electronic components have been mounted with high density. In order to further reduce the size of the substrate including the electronic components, an electronic component-incorporated substrate in which an electronic component is embedded in a substrate has also been developed (for example, see Japanese Unexamined Patent Application Publication No. 2012-114457). In the electronic component-incorporated substrate, wirings formed on the substrate and the embedded electronic component need to be electrically connected to each other reliably.

Furthermore, it is desired for a capacitor that equivalent series inductance (ESL) is decreased. For example, Japanese Unexamined Patent Application Publication Nos. 2001-155962 and 2001-102243 have proposed units for decreasing the ESL.

However, a capacitor disclosed in Japanese Unexamined Patent Application Publication No. 2001-155962 or 2001-102243 has been proposed without considering incorporation thereof in a substrate and contact property with wirings when the capacitor is incorporated in the substrate. That is, the capacitor disclosed in Japanese Unexamined Patent Application Publication No. 2001-155962 or 2001-102243 is not suitable for incorporation in the substrate.

SUMMARY OF THE INVENTION

Preferred embodiments of the present invention provide a capacitor with decreased ESL that is suitable for incorporation into a substrate.

A first capacitor according to a preferred embodiment of the present invention includes a capacitor main body, a plurality of inner electrodes, and an outer electrode. The capacitor main body includes first and second main surfaces, first and second side surfaces, and first and second end surfaces. The first and second main surfaces extend along a lengthwise direction and a width direction. The first and second side surfaces extend along the lengthwise direction and a height direction. The first and second end surfaces extend along the width direction and the height direction. The plurality of inner electrodes are provided in the capacitor main body. The plurality of inner electrodes are exposed at each of the first and second side surfaces. The outer electrode extends over the first and second main surfaces from exposed portions of the inner electrodes on the first side surface and exposed portions of the inner electrodes on the second side surface. The plurality of inner electrodes include a first inner electrode and a second inner electrode. The second inner electrode opposes the first inner electrode in the height direction. The first inner electrode includes a first opposing portion which opposes the second inner electrode, first and second lead out portions which are connected to the first opposing portion and which are each located on the first side surface, and third and fourth lead out portions which are connected to the first opposing portion and which are each located on the second side surface. The second inner electrode includes a second opposing portion which opposes the first opposing portion, a fifth lead out portion which is connected to the second opposing portion and located on the first side surface, and a sixth lead out portion which is connected to the second opposing portion and located on the second side surface. The outer electrode includes a first outer electrode which covers an exposed portion of the first lead out portion on the first side surface and an exposed portion of the third lead out portion on the second side surface and encircles the first side surface, the first main surface, the second side surface, and the second main surface, a second outer electrode which covers an exposed portion of the second lead out portion on the first side surface and an exposed portion of the fourth lead out portion on the second side surface and encircles the first side surface, the first main surface, the second side surface, and the second main surface, and a third outer electrode which covers an exposed portion of the fifth lead out portion on the first side surface and an exposed portion of the sixth lead out portion on the second side surface and encircles the first side surface, the first main surface, the second side surface, and the second main surface. An outermost layer of the outer electrode includes a Cu-plated layer.

In a capacitor according to a preferred embodiment of the present invention, the outermost layer of the outer electrode includes the Cu-plated layer. Therefore, incorporating the capacitor into a substrate is easy. More specifically, when the capacitor is incorporated into the substrate, a via hole electrode that connects an electronic component and a wiring of the substrate is provided. Therefore, a via hole facing an outer electrode of the electronic component is formed in the substrate by a $CO_2$ laser, for example. In a capacitor according to a preferred embodiment of the present invention, the outermost layer of the outer electrode includes the Cu-plated layer. Therefore, laser light that is emitted for forming the via hole is reflected by the outer electrode with high reflectance, thus significantly reducing or preventing deterioration of the capacitor. Accordingly, the capacitor is able to be easily incorporated into the substrate.

In a capacitor according to a preferred embodiment of the present invention, the first outer electrode covers first and second ridge line portions defined by the first and second main surfaces and the first end surface and third and fourth ridge line portions defined by the first and second side surfaces and the first end surface, and the second outer electrode covers fifth and sixth ridge line portions defined by the first and second main surfaces and the second end surface and seventh and eighth ridge line portions defined by the first and second side surfaces and the second end surface. In this case, the ridge line portions of the capacitor main body are protected by the outer electrode. Therefore, when external impact and stress act on the capacitor, even if the stress is concentrated on the ridge line portions of the capacitor main body, the capacitor main body is difficult to be damaged. Accordingly, reliability of the capacitor is able to be improved.

In a capacitor according to a preferred embodiment of the present invention, the first outer electrode extends to the first end surface and does not entirely cover the first end surface, and the second outer electrode extends to the second end surface and does not entirely cover the second end surface. In this case, the surface of the capacitor main body including higher close contact force with a capacitor-incorporated substrate than that of the outer electrode is able to be exposed, thus increasing the close contact force between the capacitor and the capacitor-incorporated substrate. Accordingly, entrance of water or the like into the capacitor-incorporated substrate is able to be prevented. Thus, reliability of the capacitor is able to be improved.

Furthermore, a thickness t1 of a portion of the third outer electrode, which is provided on the first main surface, is preferably smaller than a thickness t2 of portions of the first and second outer electrodes, which are provided on the first main surface, and a thickness t1 of a portion of the third outer electrode, which is provided on the second main surface, is preferably smaller than a thickness t2 of portions of the first and second outer electrodes, which are provided on the second main surface, for example. In this case, when the capacitor is mounted on the substrate, abutment of mount nozzles of a mounting machine against only the third outer electrode is able to be significantly reduced or prevented. More specifically, the mount nozzles of the mounting machine also abut against the first and second outer electrodes. Accordingly, stress that is generated from suction of the mount nozzles is able to be dispersed. Accordingly, generation of cracks or the like on the capacitor main body from end portions of the outer electrode as starting points is able to be significantly reduced or prevented. Thus, reliability of the capacitor is able to be improved.

To more effectively reduce or prevent the generation of the cracks or the like on the capacitor main body from the end portions of the outer electrode as the starting points, a difference between the thickness t1 of the portion of the third outer electrode, which is provided on the first or second main surface, and the thickness t2 of the portions of the first and second outer electrodes, which are provided on the first or second main surface, is preferably equal to or larger than about 0.5 µm, for example. When the difference between t1 and t2 is too large, a contact property between the third outer electrode of the capacitor and the via hole electrode is lowered in some cases. The difference between t1 and t2 is preferably equal to or smaller than about 15 µm, for example.

A capacitor according to another preferred embodiment of the present invention includes a capacitor main body, a plurality of inner electrode, and an outer electrode. The capacitor main body includes first and second main surfaces, first and second side surfaces, and first and second end surfaces. The first and second main surfaces extend along a lengthwise direction and a width direction. The first and second side surfaces extend along the lengthwise direction and a height direction. The first and second end surfaces extend along the width direction and the height direction. The plurality of inner electrode are provided in the capacitor main body. The plurality of inner electrodes are exposed at each of the first and second side surfaces. The outer electrode extends over the first and second main surfaces from exposed portions of the inner electrodes on the first side surface and exposed portions of the inner electrodes on the second side surface. The plurality of inner electrodes include a first inner electrode and a second inner electrode opposing the first inner electrode in the height direction. The first inner electrode includes a first opposing portion which opposes the second inner electrode, a first lead out portion which is connected to the first opposing portion and located on the first side surface, and second and third lead out portions which are connected to the first opposing portion and which are each located on the second side surface. The second inner electrode includes a second opposing portion which opposes the first opposing portion, fourth and fifth lead out portions which are connected to the second opposing portion and which are each located on the first side surface, and a sixth lead out portion which is connected to the second opposing portion and located on the second side surface. The outer electrode includes a first outer electrode which is provided over an exposed portion of the first lead out portion on the first side surface and each of the first and second main surfaces, a second outer electrode which is provided over an exposed portion of the second lead out portion on the second side surface and each of the first and second main surfaces, a third outer electrode which is provided over an exposed portion of the third lead out portion on the second side surface and each of the first and second main surfaces, a fourth outer electrode which is provided over an exposed portion of the fourth lead out portion on the first side surface and each of the first and second main surfaces, a fifth outer electrode which is provided over an exposed portion of the fifth lead out portion on the first side surface and each of the first and second main surfaces, and a sixth outer electrode which is provided over an exposed portion of the sixth lead out portion on the second side surface and each of the first and second main surfaces. An outermost layer of the outer electrode includes a Cu-plated layer.

In a capacitor according to a preferred embodiment of the present invention, the outermost layer of the outer electrode includes the Cu-plated layer. Therefore, incorporation thereof in a substrate is easy. More specifically, when the capacitor is incorporated in the substrate, a via hole electrode that connects an electronic component and a wiring of the substrate is provided. Therefore, a via hole facing an outer electrode of the electronic component is formed in the substrate by a $CO_2$ laser, for example. In a capacitor according to a preferred embodiment of the present invention, the outermost layer of the outer electrode includes the Cu-plated layer. Therefore, laser light that is emitted for forming the via hole is reflected by the outer electrode with high reflectance, thus significantly reducing or preventing deterioration of the capacitor. Accordingly, the capacitor is able to be easily incorporated in the substrate.

In a capacitor according to a preferred embodiment of the present invention, the second outer electrode covers first and second ridge line portions defined by the first and second main surfaces and the first end surface and a third ridge line portion defined by the second side surface and the first end surface, the fourth outer electrode covers the first and second ridge line portions and a fourth ridge line portion defined by the first side surface and the first end surface, the third outer electrode covers fifth and sixth ridge line portions defined by the first and second main surfaces and the second end surface and a seventh ridge line portion defined by the second side surface and the second end surface, and the fifth outer electrode covers the fifth and sixth ridge line portions and an eighth ridge line portion defined by the first side surface and the second end surface. In this case, the ridge line portions of the capacitor main body are protected by the outer electrode. Therefore, when external impact and stress act on the capacitor, even if the stress is concentrated on the ridge line portions of the capacitor main body, the capacitor main body is difficult to be damaged. Accordingly, reliability of the capacitor is able to be improved.

In a capacitor according to a preferred embodiment of the present invention, the second outer electrode extends to the first end surface and does not entirely cover the first end surface in a region in which the second outer electrode is formed in the width direction when seen in plan view, the fourth outer electrode extends to the first end surface and does not entirely cover the first end surface in a region in which the fourth outer electrode is formed in the width direction when seen in plan view, the third outer electrode extend to the second end surface and do not entirely cover the second end surface in a region in which the third outer electrode extends in the width direction when seen in plan view, and the fifth outer electrode extend to the second end surface and do not entirely cover the second end surface in a region in which the fifth outer electrode extends in the width direction when seen in plan view. In this case, the surface of the capacitor main body including higher close contact force with a capacitor-incorporated substrate than that of the outer electrode is able to be exposed, thus increasing the close contact force between the capacitor and the capacitor-incorporated substrate. Accordingly, entrance of water or the like into the capacitor-incorporated substrate is able to be significantly reduced or prevented. Thus, reliability of the capacitor is able to be improved.

Furthermore, in a capacitor according to a preferred embodiment of the present invention, a thickness t3 of portions of the first and sixth outer electrodes, which are provided on the first main surface, is preferably smaller than a thickness t4 of portions of the second to fifth outer electrodes, which are provided on the first main surface, and a thickness t3 of portions of the first and sixth outer electrodes, which are provided on the second main surface, is preferably smaller than a thickness t4 of portions of the second to fifth outer electrodes, which are provided on the second main surface, for example. In this case, when the capacitor is mounted on the substrate, abutment of mount nozzles of a mounting machine against only the first and sixth outer electrodes is able to be significantly reduced or prevented. More specifically, the mount nozzles of the mounting machine also abut against the second to fifth outer electrodes. Accordingly, stress that is generated from suction of the mount nozzles is able to be dispersed. Accordingly, generation of cracks or the like on the capacitor main body from end portions of the outer electrode as starting points is able to be significantly reduced or prevented. Thus, reliability of the capacitor is able to be improved.

To more effectively reduce or prevent the generation of the cracks or the like on the capacitor main body from the end portions of the outer electrode as the starting points, a difference between the thickness t3 of the portions of the first and sixth outer electrodes, which are provided on the first or second main surface, and the thickness t4 of the portions of the second to fifth outer electrodes, which are provided on the first or second main surface, is preferably equal to or larger than about 0.5 μm, for example. When the difference between t3 and t4 is too large, a contact property between the first and sixth outer electrodes of the capacitor and the via hole electrode is lowered in some cases. The difference between t3 and t4 is preferably equal to or smaller than about 15 μm, for example.

In the capacitors according to various preferred embodiments of the present invention, a dimension in the height direction may be smaller than a dimension in the width direction.

According to various preferred embodiments of the present invention, capacitors decreased in ESL and suitable for incorporation in a substrate are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
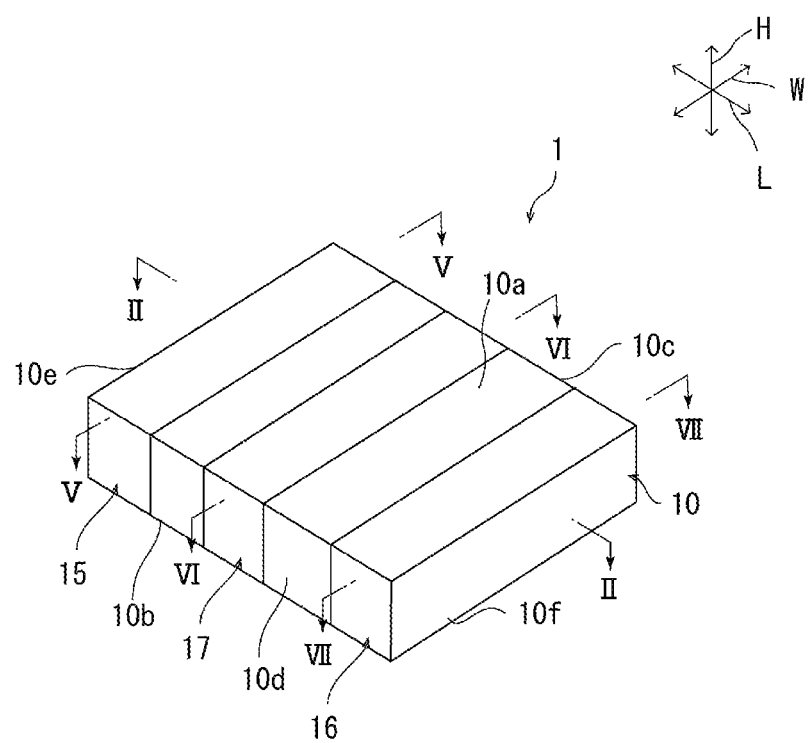
FIG. 1 is a schematic perspective view of a capacitor according to a first preferred embodiment of the present invention.

Hereinafter, the present invention will be clarified through description of specific preferred embodiments of the present invention with reference to the drawings.

It is to be noted that the preferred embodiments described in this specification are merely examples, and that the configurations and features of the preferred embodiments are able to be partly replaced or combined between different preferred embodiments.

Furthermore, the same reference numerals in the respective drawings denote elements including the same or substantially the same features in the preferred embodiments and the like. The drawings referred to in the preferred embodiments and the like are schematically illustrated. Ratios and the like of dimensions of objects shown in the drawings are different from ratios and the like of dimensions of actual objects in some cases. The ratios and the like of the dimensions of the objects are different between the drawings in some cases. The specific ratios and the like of the dimensions of the objects should be determined while considering the following description.

First Preferred Embodiment

Figure 2:
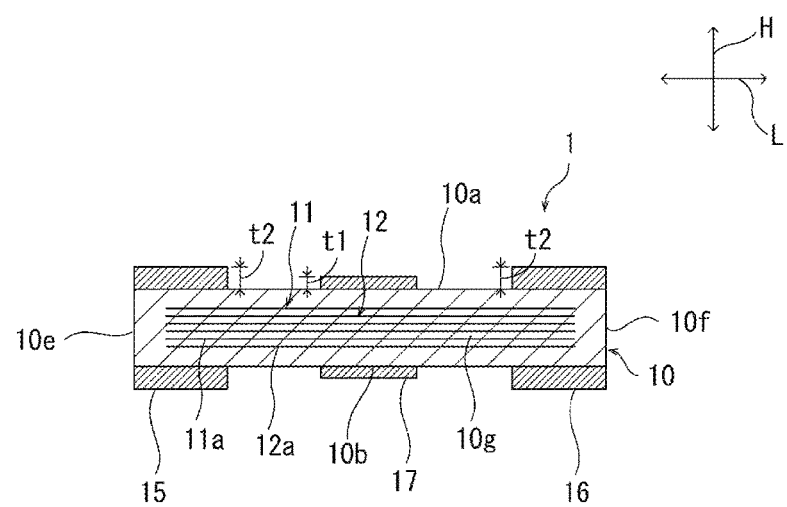
FIG. 2 is a schematic cross-sectional view of a portion cut along line II-II in FIG. 1.
Figure 3:
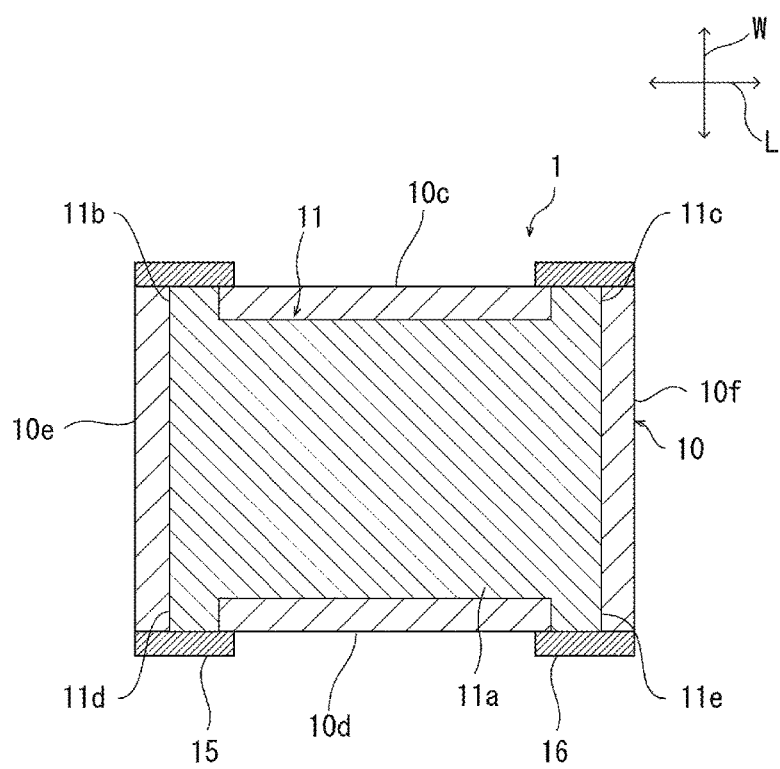
FIG. 3 is a schematic cross-sectional view of the capacitor according to the first preferred embodiment of the present invention.
Figure 4:
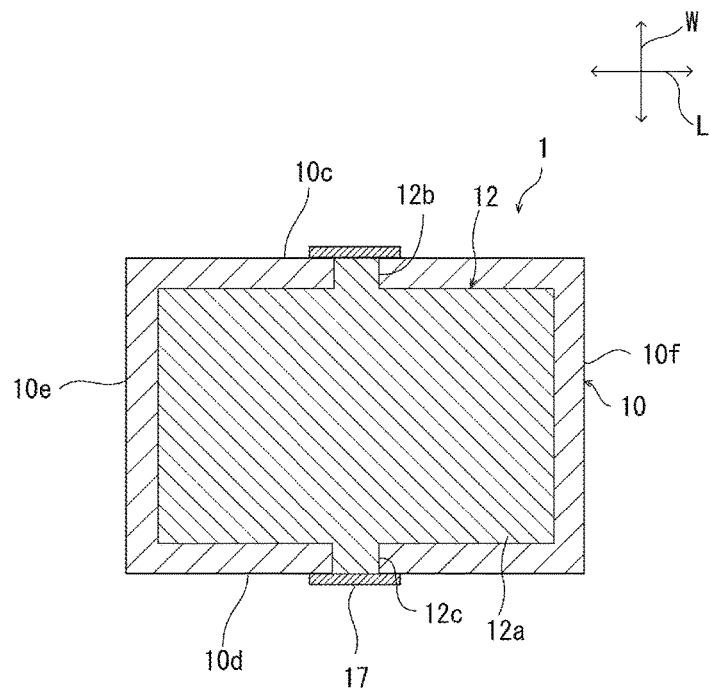
FIG. 4 is a schematic cross-sectional view of the capacitor according to the first preferred embodiment of the present invention.
Figure 5:
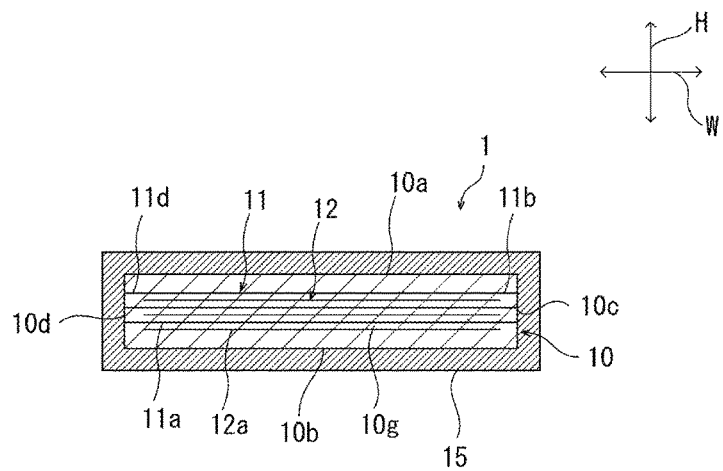
FIG. 5 is a schematic cross-sectional view of a portion cut along line V-V in FIG. 1.
Figure 6:
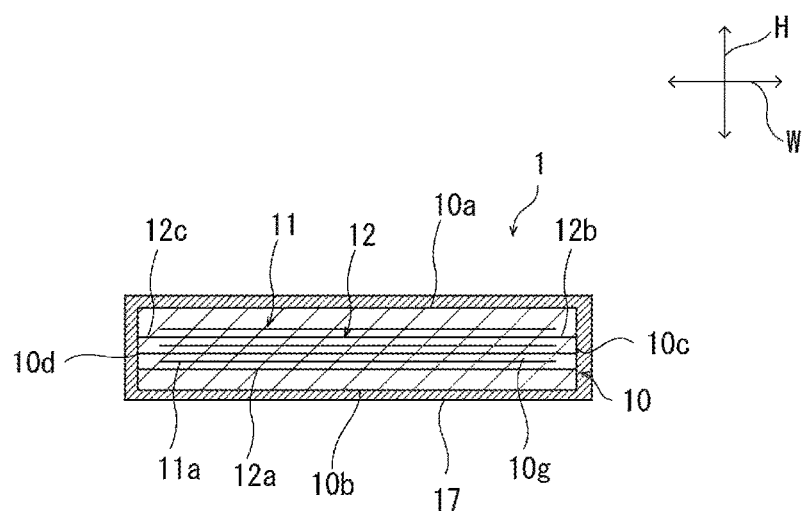
FIG. 6 is a schematic cross-sectional view of a portion cut along line VI-VI in FIG. 1.
Figure 7:
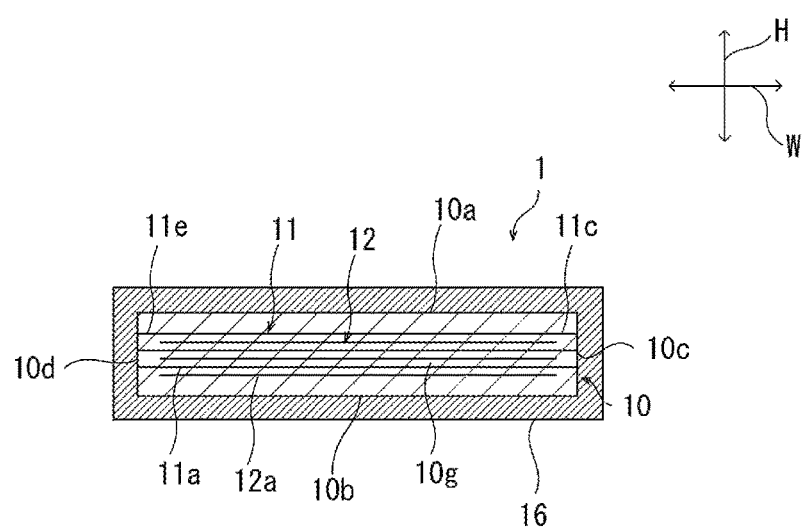
FIG. 7 is a schematic cross-sectional view of a portion cut along line VII-VII in FIG. 1.

FIG. 1 is a schematic perspective view of a capacitor according to a first preferred embodiment of the present invention. FIG. 2 is a schematic cross-sectional view of a portion cut along line II-II in FIG. 1. FIG. 3 is a schematic cross-sectional view of the capacitor according to the first preferred embodiment. FIG. 4 is a schematic cross-sectional view of the capacitor according to the first preferred embodiment. FIG. 5 is a schematic cross-sectional view of a portion cut along line V-V in FIG. 1. FIG. 6 is a schematic cross-sectional view of a portion cut along line VI-VI in FIG. 1. FIG. 7 is a schematic cross-sectional view of a portion cut along line VII-VII in FIG. 1.

As shown in FIG. 1 to FIG. 7, a capacitor 1 includes a capacitor main body 10. The capacitor main body 10 preferably has a rectangular parallelepiped or a substantially rectangular parallelepiped shape. The capacitor main body 10 includes first and second main surfaces 10a and 10b, first and second side surfaces 10c and 10d, and first and second end surfaces 10e and 10f. The first and second main surfaces 10a and 10b extend along a lengthwise direction L and a width direction W. The width direction W is perpendicular to the lengthwise direction L. The first and second side surfaces 10c and 10d extend along the lengthwise direction L and a height direction H. The height direction H is perpendicular to each of the lengthwise direction L and the width direction W. The first and second end surfaces 10e and 10f extend along the width direction W and the height direction H. Ridge line portions and corner portions of the capacitor main body 10 may include chamfered or substantially chamfered shapes or rounded or substantially rounded shapes. Preferably, the ridge line and corner portions of the capacitor main body 10 include the round or substantially rounded shapes, for example, to help reduce or prevent the generation of cracks.

The capacitor main body 10 includes, for example, appropriate dielectric ceramics. More specifically, the capacitor main body 10 includes, for example, dielectric ceramics including $BaTiO_3$, $CaTiO_3$, $SrTiO_3$, $CaZrO_3$, or the like. A Mn compound, Fe compound, Cr compound, Co compound, Ni compound, or the like may be added to the capacitor main body 10.

Although the dimensions of the capacitor main body 10 are not particularly limited, at least one of the conditions of DT <DW<DL, (⅕)DW≤DT≤(½)DW, and DT<about 0.3 mm is preferably satisfied when the height dimension of the capacitor main body 10 is DT, the length dimension thereof is DL, and the width dimension thereof is DW, for example. Furthermore, the conditions of about 0.05 mm≤DT<about 0.3 mm, about 0.4 mm≤DL ≤about 1.1 mm, and about 0.3 mm≤DW≤about 0.7 mm are preferably satisfied, for example.

The dimension of the capacitor 1 along the height direction H is preferably smaller than the dimension of the capacitor 1 along the width direction W, and is preferably equal to or smaller than about ½ of the dimension of the capacitor 1 along the width direction W, for example. In this case, the capacitor 1 is reduced in thickness and is therefore suitable for incorporation in a substrate. However, as the dimension of the capacitor 1 along the height direction H is decreased, the capacitance of the capacitor 1 also decreases. Accordingly, the dimension of the capacitor 1 along the height direction H is preferably equal to or larger than about ⅕ of the dimension thereof along the width direction W, and is more preferably equal to or smaller than about ½ of the dimension thereof along the width direction W, for example.

As shown in FIG. 2, a plurality of inner electrodes 11 and 12 are provided in the capacitor main body 10. More specifically, the plurality of first inner electrodes 11 and the plurality of second inner electrodes 12 are alternately arranged in the capacitor main body 10 along the height direction H. A ceramic portion 10g is located between adjacent ones of the first inner electrodes 11 and the second inner electrodes 12 that oppose each other in the height direction H. The thickness of the ceramic portion 10g is preferably between about 0.5 μm and about 10 μm, for example.

As shown in FIG. 3, the first inner electrodes 11 are exposed at each of the first side surface 10c and the second side surface 10d. More specifically, each of the first inner electrodes 11 includes an opposing portion 11a, a first lead out portion 11b, a second lead out portion 11c, a third lead out portion 11d, and a fourth lead out portion 11e. The opposing portion 11a opposes the second inner electrode 12 in the height direction H. The opposing portion 11a preferably has a rectangular or substantially rectangular shape. The first lead out portion 11b is connected to the opposing portion 11a. The first lead out portion 11b is located on the first side surface 10c. The second lead out portion 11c is connected to the opposing portion 11a. The second lead out portion 11c is located on the first side surface 10c. The first lead out portion 11b is connected to an end portion of the opposing portion 11a at one side in the lengthwise direction L, and the second lead out portion 11c is connected to an end portion of the opposing portion 11a at the other side in the lengthwise direction L. The third lead out portion 11d is connected to the opposing portion 11a. The third lead out portion 11d is located on the second side surface 10d. The fourth lead out portion 11e is connected to the opposing portion 11a. The fourth lead out portion 11e is located on the second side surface 10d. The third lead out portion 11d is connected to an end portion of the opposing portion 11a at one side in the lengthwise direction L, and the fourth lead out portion 11e is connected to an end portion of the opposing portion 11a at the other side in the lengthwise direction L.

As shown in FIG. 4, the second inner electrodes 12 are exposed at each of the first side surface 10c and the second side surface 10d. More specifically, each of the second inner electrodes 12 includes an opposing portion 12a, a fifth lead out portion 12b, and a sixth lead out portion 12c. The opposing portion 12a opposes the opposing portion 11a in the height direction H. The opposing portion 12a preferably has a rectangular or substantially rectangular shape. The fifth lead out portion 12b is connected to the opposing portion 12a. The fifth lead out portion 12b is located on the first side surface 10c. The fifth lead out portion 12b is located between the first lead out portion 11b and the second lead out portion 11c in the lengthwise direction L. The sixth lead out portion 12c is connected to the opposing portion 12a. The sixth lead out portion 12c is located on the second side surface 10d. The sixth lead out portion 12c is located between the third lead out portion 11*d* and the fourth lead out portion 11*e* in the lengthwise direction L. The widths of the lead out portions 11*b*, 11*c*, 11*d*, 11*e*, 12*b*, and 12*c* are preferably, for example, between about 50 μm and about 100 μm.

All of the lead out portions 11*b*, 11*c*, 11*d*, 11*e*, 12*b*, and 12*c* of the inner electrodes 11 and 12 are located on the first or second side surface of the capacitor main body 10 as described above. Accordingly, respective intervals of the lead out portions 11*b*, 11*c*, 11*d*, 11*e*, 12*b*, and 12*c* of the inner electrodes 11 and 12 are able to be made small, thus decreasing the length of a path through which electric current flows in the capacitor 1. Accordingly, an equivalent series inductance (ESL) of the capacitor 1 is able to be decreased.

The thicknesses of the first and second inner electrodes 11 and 12 are preferably, for example, between about 0.2 μm and about 2 μm.

The first and second inner electrodes 11 and 12 each include an appropriate conductive material. The first and second inner electrodes preferably include, for example, metal such as Ni, Cu, Ag, Pd and Au, or alloy including at least one of these metals, such as an Ag—Pd alloy.

As shown in FIG. 1, the capacitor 1 includes a plurality of outer electrodes 15, 16, and 17. More specifically, the capacitor 1 includes the first outer electrode 15, the second outer electrode 16, and the third outer electrode 17.

The first outer electrode 15 is provided over the first and second main surfaces 10*a* and 10*b*, and covers exposed portions of the first lead out portions 11*b* of the first inner electrodes 11 on the first side surface 10*c* and exposed portions of the third lead out portions 11*d* of the first inner electrodes 11 on the second side surface 10*d*. More specifically, the first outer electrode 15 covers the exposed portions of the first lead out portions 11*b* and the third lead out portions 11*d* and encircles the first side surface 10*c*, the first main surface 10*a*, the second side surface 10*d*, and the second main surface 10*b*. The width of the first outer electrode 15 is preferably between about 190 μm and about 270 μm, for example.

The second outer electrode 16 is provided over the first and second main surfaces 10*a* and 10*b*, and covers exposed portions of the second lead out portions 11*c* of the first inner electrodes 11 on the first side surface 10*c* and exposed portions of the fourth lead out portions 11*e* of the first inner electrodes 11 on the second side surface 10*d*. More specifically, the second outer electrode 16 covers the exposed portions of the second lead out portions 11*c* and the fourth lead out portions 11*e* and encircles the first side surface 10*c*, the first main surface 10*a*, the second side surface 10*d*, and the second main surface 10*b*. The width of the second outer electrode 16 is preferably between about 190 μm and about 270 μm, for example.

The first outer electrode 15 is provided on a first end portion of the capacitor main body 10 at one side of the capacitor main body 10 in the lengthwise direction L. The second outer electrode 16 is provided on a second end portion of the capacitor main body 10 at the opposing side of the capacitor main body 10 in the lengthwise direction L.

The third outer electrode 17 is provided between the first outer electrode 15 and the second outer electrode 16 in the lengthwise direction L. The third outer electrode 17 is provided over the first and second main surfaces 10*a* and 10*b*, and covers exposed portions of the fifth lead out portions 12*b* of the second inner electrodes 12 on the first side surface 10*c* and exposed portions of the sixth lead out portions 12*c* of the second inner electrodes 12 on the second side surface 10*d*. More specifically, the third outer electrode 17 covers the exposed portions of the fifth lead out portions 12*b* and the sixth lead out portions 12*c* and encircles the first side surface 10*c*, the first main surface 10*a*, the second side surface 10*d*, and the second main surface 10*b*. The width of the third outer electrode 17 is preferably between about 240 μm and about 320 μm, for example. A distance between the third outer electrode 17 and the first or second outer electrode 15 or 16 along the lengthwise direction L is preferably equal to or larger than about 70 μm, for example.

The first to third outer electrodes 15 to 17 encircle the capacitor main body 10 as described above. Therefore, sufficient areas of the outer electrodes 15 to 17 are able to be provided, thus easily forming via holes facing the outer electrodes 15 to 17 of the capacitor 1 embedded in a substrate. Furthermore, a plurality of via hole electrodes is able to be electrically connected to each of the outer electrodes 15 to 17, thus reducing wiring resistance to the capacitor 1 from the substrate side. Accordingly, the ESL is able to be further decreased.

The outermost layers of the first to third outer electrodes 15 to 17 include Cu-plated layers.

The first to third outer electrodes 15 to 17 are able to include, for example, multilayer bodies of base electrode layers, thin film electrode layers, and the Cu-plated layers.

The base electrode layers preferably include at least one metal selected from a group including Cu, Ni, Ag, Pd, Ag—Pd alloy, Au, and the like, for example. The base electrode layers may be formed by being sintered simultaneously or substantially simultaneously with the capacitor main body 10 including the inner electrodes 11 and 12. Alternatively, the base electrode layers may be formed by baking the capacitor main body 10 including the inner electrodes 11 and 12, and then applying and baking conductive pastes onto the capacitor main body 10. Furthermore, the base electrode layers may be formed by plating or formed by curing conductive resin including a thermosetting resin. Preferably, the base electrode layers further include an inorganic coupling material, for example. The inorganic coupling material is a component for enhancing close contact strength to the capacitor main body 10. When the base electrode layers are formed by being sintered simultaneously or substantially simultaneously with the capacitor main body 10 including the inner electrodes 11 and 12, the inorganic coupling material is also called a common material. In this case, the inorganic coupling agent is preferably a ceramic material that is the same as or similar to the ceramic material included in the capacitor main body 10, for example. The inorganic coupling material may be a ceramic material including a main component that is the same as or similar to the ceramic material included in the capacitor main body 10, for example. The inorganic coupling material of the base electrode layers may be, for example, a glass component. The base electrode layers are formed on the exposed portions of the inner electrodes 11 and 12 on the first and second side surfaces 10*c* and 10*d* of the capacitor main body 10. Note that the base electrode layers may extend not only onto the exposed portions of the inner electrodes 11 and 12 on the first and second side surfaces 10*c* and 10*d* but also to ridge line portions on which the first and second main surfaces 10*a* and 10*b* and the first and second side surfaces 10*c* and 10*d* of the capacitor main body 10 intersect with each other or may be formed on portions of the main surfaces 10*a* and 10*b* of the capacitor main body 10. According to the first preferred embodiment, the first outer electrode 15 and the second outer electrode 16 are not arranged on the ridge line portions on which the first and second main surfaces 10*a* and 10*b* and the first and second end surfaces 10*e* and 10*f* intersect with each other and on the first and second end surfaces 10e and 10f. Therefore, the surface area of the capacitor main body 10 with a high close contact force with resin forming the substrate is able to be increased. Accordingly, an effective close contact property between the substrate and the capacitor 1 is able to be provided.

The maximum thicknesses of the base electrode layers are preferably equal to or larger than about 1 μm, for example.

According to the first preferred embodiment, the thin film electrode layers are provided on the base electrode layers and the first and second main surfaces 10a and 10b. The thin film electrode layers preferably include at least one metal selected from a group including Mg, Al, Ti, W, Cr, Cu, Ni, Ag, Co, Mo, and V, for example. In this case, adhesion forces of the outer electrodes 15 to 17 to the capacitor main body 10 are able to be increased. The thicknesses of the thin film electrode layers are preferably between about 0.05 μm and about 1 μm, for example. Each of the thin film electrode layers may be a single layer or may be a multilayer body including a plurality of layers. The thin film electrode layers are able to be formed by, for example, a sputtering method or the like.

Figure 20:
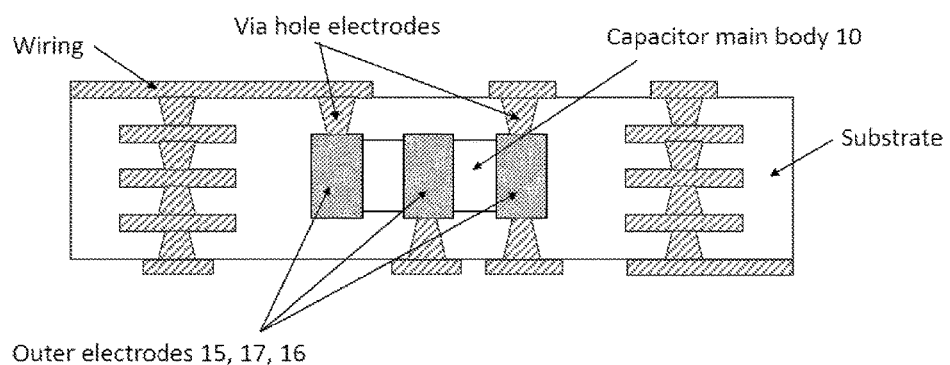
FIG. 20 is a schematic perspective view of a capacitor buried in a substrate according to a preferred embodiment of the present invention.

The Cu-plated layers cover the base electrode layers and the thin film electrode layers. Each of the plated layers may include a single layer or a plurality of layers. However, the outermost layer of each of the plated layers includes the Cu-plated layer. Because the outermost layers of the plated layers include the Cu-plated layers, thus the capacitor 1 is easily incorporated into the substrate when it is embedded in the substrate. In this case, as shown in FIG. 20, electronic component-connecting via holes that electrically connect the substrate to the outer electrodes 15 to 17 are provided when the capacitor 1 is embedded in the substrate. The electronic component-connecting via holes are formed by a laser, for example, a $CO_2$ laser. When the via holes are formed by the laser, the outer electrodes 15 to 17 of the capacitor 1 are directly irradiated with the laser. In this case, when the outermost layers of the outer electrodes 15 to 17 include the Cu-plated films, the laser is able to be reflected with a high reflectance. Accordingly, the capacitor 1 in which the outermost layers of the plated layers include the Cu-plated layers is able to be preferably included as a capacitor that is embedded in the substrate, for example. If the reflectance of the laser by the outer electrodes 15 to 17 is low, the laser reaches an inner portion of the capacitor and the capacitor may become damaged.

The thickness of one layer of the plated films is preferably between about 1 μm and about 15 μm, for example. Conductive resin layers that moderate stress may be provided between the base electrode layers and the plated layers.

As shown in FIG. 2, according to the first preferred embodiment, a thickness t1 of a portion of the third outer electrode 17, which is provided on the first or second main surface 10a or 10b, is smaller than a thickness t2 of portions of the first and second outer electrodes 15 and 16, which are provided on the first or second main surface 10a or 10b. Therefore, when the capacitor 1 is mounted on the substrate, abutment of mount nozzles of a mounting machine against only the third outer electrode 17 is able to be significantly reduced or prevented. More specifically, the mount nozzles of the mounting machine also abut against the first and second outer electrodes 15 and 16. Accordingly, stress that is generated from suction of the mount nozzles them is able to be dispersed. Accordingly, generation of cracks or the like on the capacitor main body 10 from end portions of the outer electrodes 15 to 17 as starting points is able to be significantly reduced or prevented. Thus, reliability of the capacitor 1 is able to be improved.

To more effectively reduce or prevent of the generation of the cracks or the like on the capacitor main body 10 from the end portions of the outer electrodes 15 to 17 as the starting points, a difference between the thickness t1 of the portion of the third outer electrode 17, which is provided on the first or second main surface 10a or 10b, and the thickness t2 of the portions of the first and second outer electrodes 15 and 16, which are provided on the first or second main surface 10a or 10b, is preferably equal to or larger than about 0.5 μm, for example.

An example of a method for manufacturing the capacitor 1 is described below.

First, a ceramic green sheet, conductive pastes for inner electrodes, and conductive pastes for outer terminal electrodes are prepared. The ceramic green sheet and the conductive pastes may include a binder and a solvent. For example, a binder and a solvent may be included as the ceramic green sheet and the conductive pastes.

Then, the conductive pastes are applied to the ceramic green sheet in a predetermined pattern by a screen printing method, a gravure printing method, or the like, for example, to form an inner electrode pattern.

Subsequently, the predetermined number of ceramic green sheets for outer layers on which the inner electrode pattern is not printed are laminated, the ceramic green sheet on which the inner electrode pattern has been printed is sequentially laminated thereon, and the predetermined number of ceramic green sheets for outer layers are laminated thereon to produce a mother multilayer body. Thereafter, the mother multilayer body is pressed in the lamination direction, for example, by an isostatic press.

Then, the mother multilayer body is cut into a predetermined size to define a raw ceramic multilayer body. In this case, ridge line portions and corner portions of the raw ceramic multilayer body may be rounded by barrel polishing or the like.

Base electrode pastes are applied onto inner electrode exposed portions that are exposed at the side surfaces of the raw ceramic multilayer body. An application method of the base electrode pastes is not limited. The application method of the base electrode pastes may include, for example, a roller transfer method or the like. By forming the base electrode layers by the roller transfer method, the base electrode layers are able to be formed on only the side surfaces of the multilayer body or on the corner portions or the ridge portions of the multilayer body and a portion of the main surfaces of the multilayer body by, for example, controlling a pressing pressure of a roller.

More specifically, the roller transfer method is preferably performed as described below. An application roller of the roller transfer method may include an elastic material or metal. A groove formed on the circumferential surface of the application roller is filled with the base electrode pastes. The application roller abuts against and moves along chip side surfaces, and the base electrode pastes are thus transferred onto the chip side surfaces. The raw ceramic multilayer body may be moved in the roller rotating direction and synchronized or substantially synchronized with rotation of the roller to efficiently transfer the base electrode pastes onto the chip side surfaces. Furthermore, excess conductive paste on the chip side surfaces may be removed by pressing a roller that is not filled with the base electrode pastes against chip side surfaces after the transfer.

Then, the raw ceramic multilayer body is sintered to provide the capacitor main body 10. A sintering temperature is preferably between about 900° C. and about 1300° C., for example, depending on a ceramic material and a conductive material that are included. Thereafter, the ridge line portions and the corner portions of the capacitor main body 10 may be rounded by performing barrel polishing or the like on the capacitor main body 10.

After that, thin film electrode layers are formed. First, the thin film electrode layers are formed by placing the sintered capacitor main body 10, on which the base electrode layers have been formed, into an exclusive mask tool. According to the arrangement of the mask tool, only regions on which the thin film electrode layers are desired to be formed are able to be exposed. Then, while only the regions on which the outer electrodes are desired to be formed on the main surfaces of the capacitor main body 10 are exposed, the capacitor main body 10 is supplied to a sputtering facility and the thin film electrode layers are formed on the predetermined regions on the main surfaces of the capacitor main body 10 by a sputtering method or the like. For example, two layers of thin film electrode layers including an NiCr film and an NiCu film (thin film electrode layers that are in contact with the capacitor main body 10) are formed.

Subsequently, the outer electrodes 15 to 17 are completed by forming the plated layers on the thin film electrode layers. Each of the plated layers may include a single layer or a plurality of layers. However, the outermost layer of each of the plated layers includes the Cu-plated layer. The plated layers are formed by, for example, electrolytic plating, electroless plating, or the like.

To provide the plated layer by electrolytic plating, a plating bath filled with a plating solution, a cathode electrode, and an anode electrode are prepared. A plating voltage is applied across the cathode electrode and the anode electrode in the plating solution, and the cathode electrode makes contact with the sintered electrode layers formed on the capacitor main body 10. Accordingly, the plated layers are precipitated on the sintered electrode layers. The sintered electrode layers of the capacitor main body 10 may be energized through a conductive medium by placing the conductive medium together with the capacitor main body 10 in the plating bath. Methods for energizing the sintered electrode layers include, for example, a vibration plating method in which the capacitor main body 10 and the conductive medium are agitated by vibration, a rotation barrel plating method in which plating is performed while the conductive medium and the capacitor main body 10 placed in a barrel are rotationally agitated, a centrifugal plating method in which the capacitor main body 10 is agitated by centrifugal force of a barrel, or the like.

Furthermore, heat treatment and/or surface treatment on the outer electrodes may be performed, if desired. The outer electrodes 15 to 17 are able to be densified by heat treatment, thus improving reliability. Furthermore, the surfaces of the outer electrodes 15 to 17 are able to be roughened by subjecting them to surface treatment, which provides an effective close contact property between resin of the component-incorporated substrate and the outer electrodes 15 to 17 when the capacitor is embedded in the substrate.

Hereinafter, other examples of the preferred embodiments of the present invention are described. In the following description, common reference numerals denote members including substantially common functions to those in the first preferred embodiment as described above, and description thereof is omitted.

Second Preferred Embodiment

Figure 8:
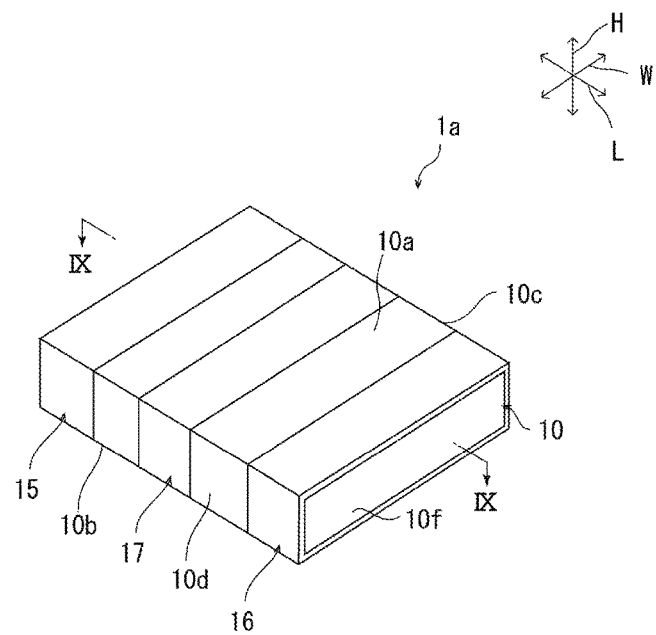
FIG. 8 is a schematic perspective view of a capacitor according to a second preferred embodiment of the present invention.
Figure 9:
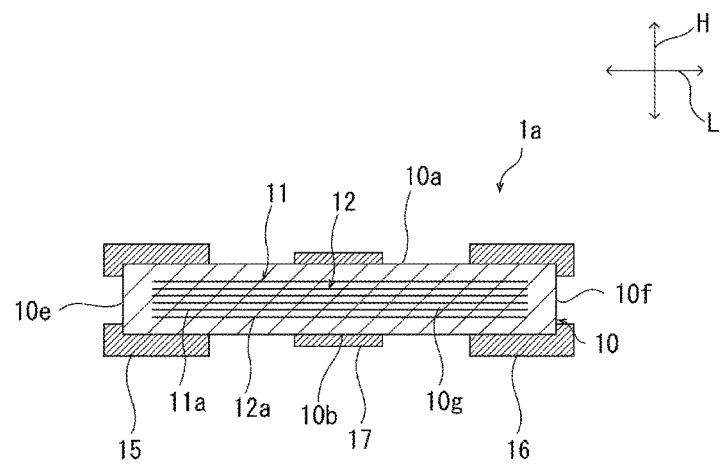
FIG. 9 is a schematic cross-sectional view of a portion cut along line IX-IX in FIG. 8.

FIG. 8 is a schematic perspective view of a capacitor 1a according to a second preferred embodiment of the present invention. FIG. 9 is a schematic cross-sectional view of a portion cut along line IX-IX in FIG. 8.

As shown in FIG. 8 and FIG. 9, the capacitor 1a according to the second preferred embodiment is different from the capacitor 1 according to the first preferred embodiment in the features and elements described below. In the capacitor 1a of the second preferred embodiment, the first outer electrode 15 is provided over ridge line portions defined by the first and second main surfaces 10a and 10b and the first end surface 10e and ridge line portions defined by the first and second side surfaces 10c and 10d and the first end surface 10e. The second outer electrode 16 is provided over ridge line portions defined by the first and second main surfaces 10a and 10b and the second end surface 10f and ridge line portions defined by the first and second side surfaces 10c and 10d and the second end surface 10f. Therefore, in the capacitor 1a, the ridge line portions of the capacitor main body 10 are protected by the outer electrodes 15 and 16. Accordingly, even when an external impact or the like acts on the capacitor 1a, the generation of cracks or the like on the capacitor main body 10 is significantly reduced or prevented.

To more effectively reduce or prevent the generation of the cracks or the like on the capacitor main body 10 when the external impact or the like act on the capacitor 1a, each of the first and second outer electrodes 15 and 16 preferably extends to the first or second end surface 10e or 10f, for example.

On center portions of the first and second end surfaces 10e and 10f, the surface of the capacitor main body is preferably exposed without arranging the outer electrodes 15 and 16, for example. Accordingly, an effective close contact property between the capacitor 1a and the resin of the substrate is able to be provided.

Third Preferred Embodiment

Figure 10:
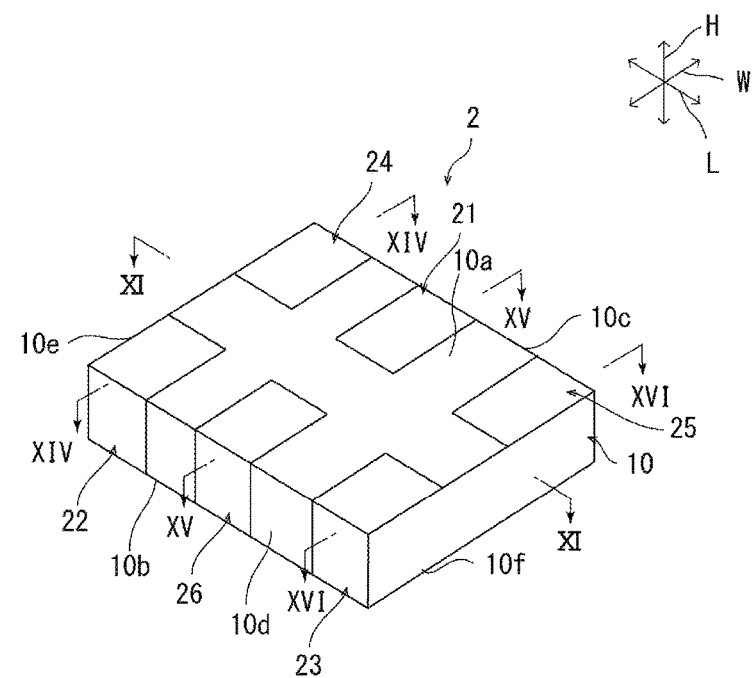
FIG. 10 is a schematic perspective view of a capacitor according to a third preferred embodiment of the present invention.
Figure 11:
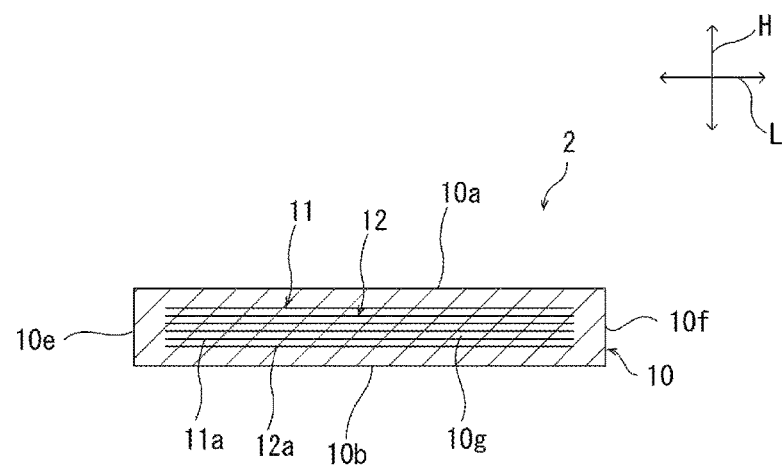
FIG. 11 is a schematic cross-sectional view of a portion cut along line XI-XI in FIG. 10.
Figure 12:
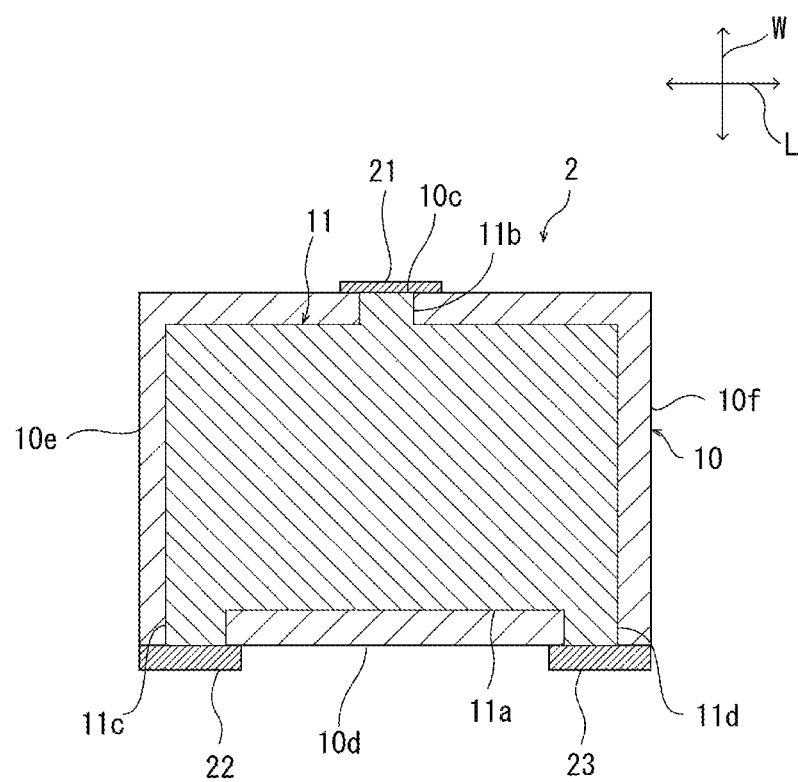
FIG. 12 is a schematic cross-sectional view of the capacitor according to the third preferred embodiment of the present invention.
Figure 13:
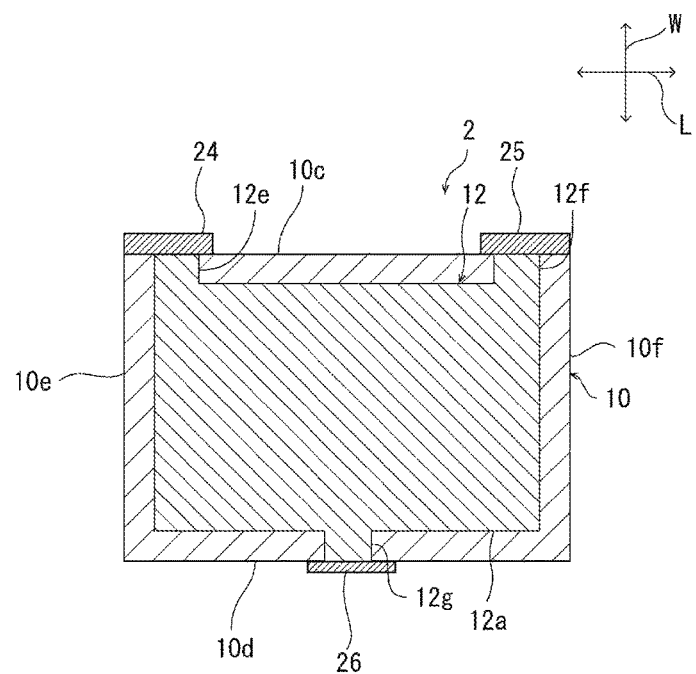
FIG. 13 is a schematic cross-sectional view of the capacitor according to the third preferred embodiment of the present invention.
Figure 14:
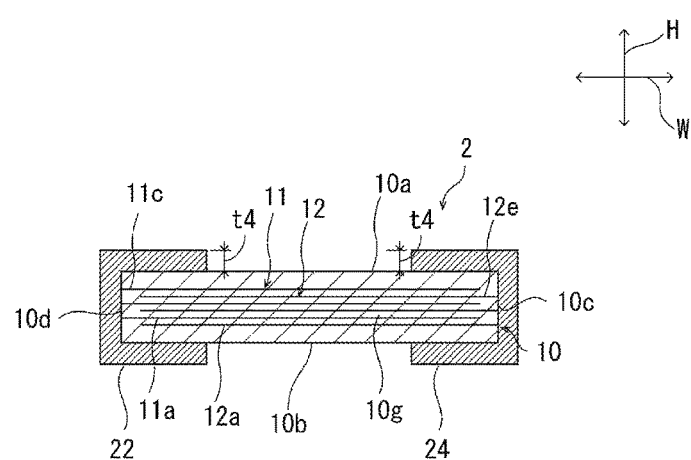
FIG. 14 is a schematic cross-sectional view of a portion cut along line XIV-XIV in FIG. 10.
Figure 15:
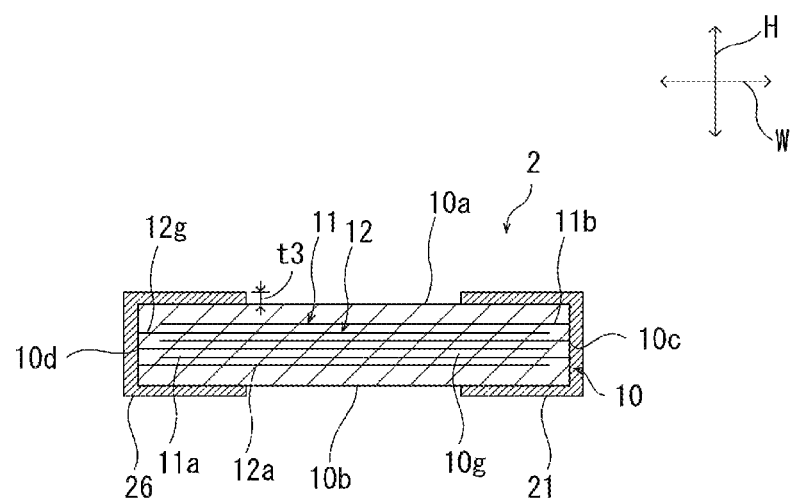
FIG. 15 is a schematic cross-sectional view of a portion cut along line XV-XV in FIG. 10.
Figure 16:
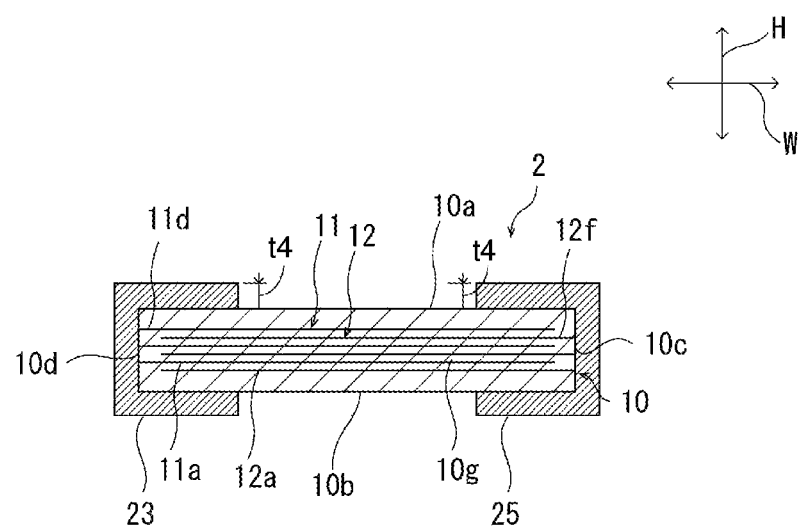
FIG. 16 is a schematic cross-sectional view of a portion cut along line XVI-XVI in FIG. 10.

FIG. 10 is a schematic perspective view of a capacitor according to a third preferred embodiment of the present invention. FIG. 11 is a schematic cross-sectional view of a portion cut along line XI-XI in FIG. 10. FIG. 12 is a schematic cross-sectional view of the capacitor according to the third preferred embodiment. FIG. 13 is a schematic cross-sectional view of the capacitor according to the third preferred embodiment. FIG. 14 is a schematic cross-sectional view of a portion cut along line XIV-XIV in FIG. 10. FIG. 15 is a schematic cross-sectional view of a portion cut along line XV-XV in FIG. 10. FIG. 16 is a schematic cross-sectional view of a portion cut along line XVI-XVI in FIG. 10.

A capacitor 2 according to the third preferred embodiment is different from the capacitor 1 according to the first preferred embodiment in the configuration and features of the first and second inner electrodes 11 and 12 and the configuration and features of the outer electrodes.

As shown in FIG. 10 to FIG. 16, the capacitor 2 includes the capacitor main body 10. The capacitor main body 10 includes substantially the same configuration and features as that of the capacitor main body 10 according to the first preferred embodiment. Therefore, the above description of the capacitor main body 10 according to the first preferred embodiment may be applied to the third preferred embodiment.

As shown in FIG. 11, the plurality of inner electrodes 11 and 12 are provided in the capacitor main body 10. More specifically, the plurality of first inner electrodes 11 and the plurality of second inner electrodes 12 are alternately arranged in the capacitor main body 10 along the height direction H. The ceramic portion 10g is located between adjacent ones of the first inner electrodes 11 and the second inner electrodes 12 that oppose each other in the height direction H. The thickness of the ceramic portion 10g is preferably between about 0.5 μm and about 10 μm, for example.

As shown in FIG. 12, the first inner electrodes 11 are exposed at each of the first side surface 10c and the second side surface 10d. More specifically, each of the first inner electrodes 11 includes the opposing portion 11a, the first lead out portion 11b, the second lead out portion 11c, and the third lead out portion 11d. The opposing portion 11a opposes the second inner electrode 12 in the height direction H. The opposing portion 11a preferably has a rectangular or substantially rectangular shape. The first lead out portion 11b is connected to the opposing portion 11a. The first lead out portion 11b is located on the first side surface 10c. The second lead out portion 11c is connected to the opposing portion 11a. The second lead out portion 11c is located on the second side surface 10d. The third lead out portion 11d is connected to the opposing portion 11a. The third lead out portion 11d is located on the second side surface 10d. The second lead out portion 11c is connected to an end portion of the opposing portion 11a at one side in the lengthwise direction L, and the third lead out portion 11d is connected to an end portion of the opposing portion 11a at the other side in the lengthwise direction L.

As shown in FIG. 13, the second inner electrodes 12 are exposed at each of the first side surface 10c and the second side surface 10d. More specifically, each of the second inner electrodes 12 includes the opposing portion 12a, a fourth lead out portion 12e, a fifth lead out portion 12f, and a sixth lead out portion 12g. The opposing portion 12a opposes the opposing portion 11a in the height direction H. The opposing portion 12a preferably has a rectangular or substantially rectangular shape. The fourth lead out portion 12e is connected to the opposing portion 12a. The fourth lead out portion 12e is located on the first side surface 10c. The fifth lead out portion 12f is connected to the opposing portion 12a. The fifth lead out portion 12f is located on the first side surface 10c. The fourth lead out portion 12e is drawn from an end portion of the opposing portion 12a at one side in the lengthwise direction L, and the fifth lead out portion 12f is drawn from an end portion of the opposing portion 12a at the other side in the lengthwise direction L. The sixth lead out portion 12g is connected to the opposing portion 12a. The sixth lead out portion 12g is located on the second side surface 10d. The widths of the lead out portions 11b, 11c, 11d, 12e, 12f, and 12g are preferably, for example, between about 50 μm and about 100 μm.

All of the lead out portions 11b, 11c, 11d, 12e, 12f, and 12g of the inner electrodes 11 and 12 are located on the first or second side surface 10c or 10d of the capacitor main body 10 as described above. Accordingly, respective intervals of the lead out portions 11b, 11c, 11d, 12e, 12f, and 12g of the inner electrodes 11 and 12 are able to be made small, thus decreasing the length of a path through which electric current flows in the capacitor 2. Accordingly, equivalent series inductance (ESL) of the capacitor 2 is able to be decreased.

The thicknesses of the first and second inner electrodes 11 and 12 are preferably, for example, between about 0.2 μm and about 2 μm.

The first and second inner electrodes 11 and 12 each include an appropriate conductive material. The first and second inner electrodes preferably include, for example, metal such as Ni, Cu, Ag, Pd and Au, or alloy including at least one these metals, such as an Ag—Pd alloy.

As shown in FIG. 10, the capacitor 2 includes a plurality of outer electrodes 21 to 26. More specifically, the capacitor 2 includes the first outer electrode 21, the second outer electrode 22, the third outer electrode 23, the fourth outer electrode 24, the fifth outer electrode 25, and the sixth outer electrode 26.

The first outer electrode 21 is provided over the first and second main surfaces 10a and 10b, and covers exposed portions of the first lead out portions 11b of the first inner electrodes 11 on the first side surface 10c.

The second outer electrode 22 is provided over the first and second main surfaces 10a and 10b, and covers exposed portions of the second lead out portions 11c of the first inner electrodes 11 on the second side surface 10d.

The third outer electrode 23 is provided over the first and second main surfaces 10a and 10b, and covers exposed portions of the third lead out portions 11d of the first inner electrodes 11 on the second side surface 10d.

The fourth outer electrode 24 is provided over the first and second main surfaces 10a and 10b, and covers exposed portions of the fourth lead out portions 12e of the second inner electrodes 12 on the first side surface 10c.

The fifth outer electrode 25 is provided over the first and second main surfaces 10a and 10b, and covers exposed portions of the fifth lead out portions 12f of the second inner electrodes 12 on the first side surface 10c.

The sixth outer electrode 26 is provided over the first and second main surfaces 10a and 10b, and covers exposed portions of the sixth lead out portions 12g of the second inner electrodes 12 on the second side surface 10d.

The outermost layers of the outer electrodes 21 to 26 include Cu-plated layers. The configurations and features of the first to sixth outer electrodes 21 to 26 according to the third preferred embodiment include substantially the same configurations and features as those of the first to third outer electrodes 15 to 17 according to the first preferred embodiment. Accordingly, description related to the first to third outer electrodes 15 to 17 according to the first preferred embodiment may be applied to the third preferred embodiment.

According to the third preferred embodiment, a thickness t3 of portions of the first and sixth outer electrodes 21 and 26, which are provided on the first or second main surface 10a or 10b, is smaller than a thickness t4 of portions of the second to fifth outer electrodes 22 to 25, which are provided on the first or second main surface 10a or 10b. Therefore, when the capacitor 2 is mounted on the substrate, abutment of mount nozzles of a mounting machine against only the first and sixth outer electrodes 21 and 26 is able to be significantly reduced or prevented. More specifically, the mount nozzles of the mounting machine also abut against the second to fifth outer electrodes 22 to 25. Accordingly, stress that is generated from suction of the mount nozzles is able to be dispersed. Accordingly, generation of cracks or the like on the capacitor main body 10 from end portions of the outer electrodes 21 to 26 as starting points is able to be significantly reduced or prevented. Thus, reliability of the capacitor 2 is able to be improved.

To more effectively reduce or prevent the generation of the cracks or the like on the capacitor main body 10 from the end portions of the outer electrodes 21 to 26 as the starting points, a difference between the thickness t3 and the thickness t4 is preferably equal to or larger than about 0.5 μm, for example.

The capacitor 2 according to the third preferred embodiment is able to be manufactured by substantially the same method as the method for manufacturing the capacitor 1 according to the first preferred embodiment, for example. Accordingly, description related to the method for manufacturing the capacitor 1 according to the first preferred embodiment may be applied to the third preferred embodiment.

Fourth Preferred Embodiment

Figure 17:
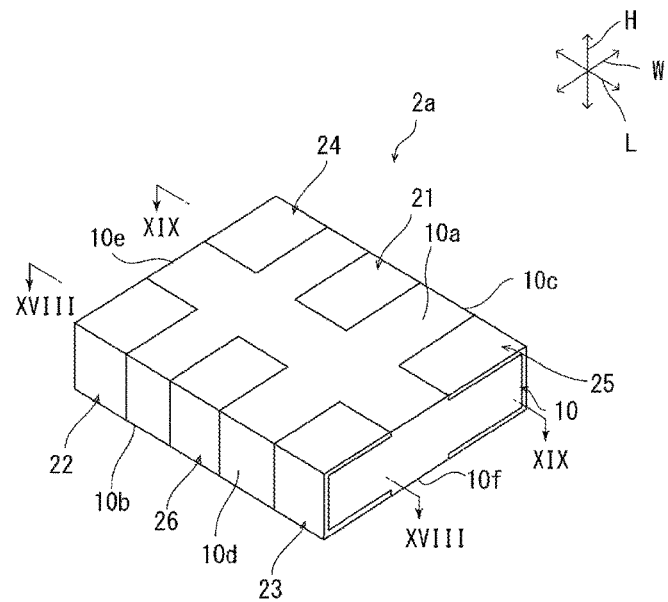
FIG. 17 is a schematic perspective view of a capacitor according to a fourth preferred embodiment of the present invention.
Figure 18:
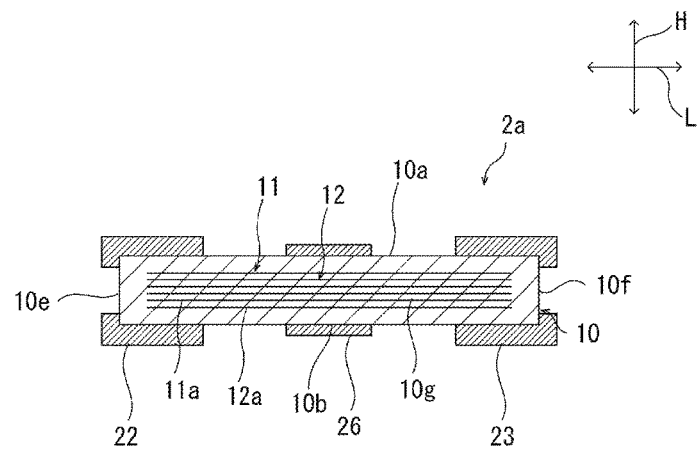
FIG. 18 is a schematic cross-sectional view of a portion cut along line XVIII-XVIII in FIG. 17.
Figure 19:
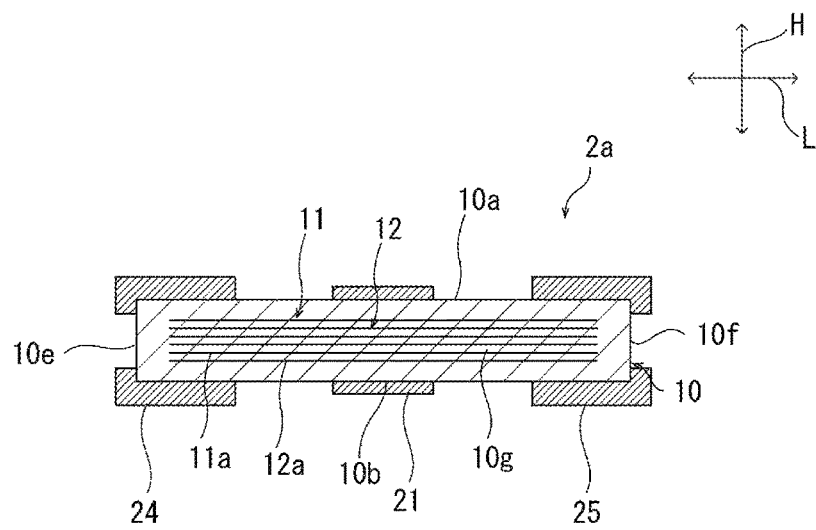
FIG. 19 is a schematic cross-sectional view of a portion cut along line XIX-XIX in FIG. 17.

FIG. 17 is a schematic perspective view of a capacitor according to a fourth preferred embodiment of the present invention. FIG. 18 is a schematic cross-sectional view of a portion cut along line XVIII-XVIII in FIG. 17. FIG. 19 is a schematic cross-sectional view of a portion cut along line XIX-XIX in FIG. 17.

As shown in FIG. 17 to FIG. 19, a capacitor 2a according to the fourth preferred embodiment is different from the capacitor 1 according to the first preferred embodiment in the features and elements described below. In the capacitor 2a of the fourth preferred embodiment, the second and fourth outer electrodes 22 and 24 are provided over ridge line portions defined by the first and second main surfaces 10a and 10b and the first end surface 10e and ridge line portions defined by the first and second side surfaces 10c and 10d and the first end surface 10e. The third and fifth outer electrodes 23 and 25 are provided over ridge line portions defined by the first and second main surfaces 10a and 10b and the second end surface 10f and ridge line portions defined by the first and second side surfaces 10c and 10d and the second end surface 10f. Therefore, in the capacitor 2a, the ridge line portions of the capacitor main body 10 are protected by the outer electrodes 22 to 25. Accordingly, even when an external impact or the like act on the capacitor 2a, the generation of cracks or the like on the capacitor main body 10 is significantly reduced or prevented.

To more effectively reduce or prevent the generation of the cracks or the like on the capacitor main body 10 when the external impact or the like act on the capacitor 2a, it each of the outer electrodes 22 to 25 preferably extends to the first or second end surface 10e or 10f, for example.

On center portions of the first and second end surfaces 10e and 10f, the surface of the capacitor main body is preferably exposed without arranging the outer electrodes 22 to 25, for example. Accordingly, an effective close contact property between the capacitor 2a and the resin of the substrate is able to be provided.

Hereinafter, preferred embodiments of the present invention are described more in detail with respect to specific examples. However, the present invention is not limited by the following examples and is able to be implemented while appropriately changing the following examples in a range without changing the general features and elements thereof.

EXPERIMENTAL EXAMPLE 1

Two thousand capacitors including substantially the same configuration and features as that of the capacitor 1 according to the first preferred embodiment were produced under the following conditions, according to the manufacturing method described according to the first preferred embodiment. In this case, the third outer electrodes were formed with heights t1 of the third outer electrodes provided on the first main surfaces that were the same or substantially the same as heights t1 of the third outer electrodes provided on the second main surfaces. Furthermore, the first and second outer electrodes were formed with heights t2 of the first and second outer electrodes provided on the first main surfaces that were the same or substantially the same as heights t2 of the first and second outer electrodes provided on the second main surfaces.

Features of the manufactured capacitors:
Dimension of each capacitor: L×W×T=1.000 mm×0.600 mm×0.220 mm
Ceramic material: $BaTiO_3$
Capacitance: 1 μF
Rated voltage: 6.3 V
Features of each outer electrode:
   Base electrode layer: Ni
   Thin film electrode layer: multilayer body of NiCr sputtered layer/NiCu sputtered layer
   Plated layer: Cu-plated layer
   Thickness of base electrode layer (center portion): 6 μm
   Thickness of thin film electrode layer (center portion): 0.3 μm (0.15 μm per layer)
   Thickness of plated layer (center portion): 10 μm
   t2−t1: as indicated in Table 1

The difference t2−t1 between the heights t1 and t2 was measured as described below.

First, the side surfaces of each capacitor were abraded in parallel or substantially in parallel with the side surfaces to provide the dimension of the capacitor in the width direction of about ½ and a cross section thereof was exposed. The cross section was observed by a microscope and the heights of the outer electrodes 15 to 17 were measured. Then, t2−t1 was calculated, with an average value of the measured height of the first outer electrode 15 and the measured height of the second outer electrode 16 indicated by t2 and the height of the third outer electrode 17 indicated by t1.

One thousand of the capacitors produced as described above were mounted on a metal substrate (size: 100 mm (t=5±0.01 mm), material: SUS304) by a mounter (SIGMA-G: Hitachi High-Technologies Corporation) and whether or not cracks were generated in each of the capacitors was checked. Presence and absence of the cracks were checked as described below. First, the side surfaces of the capacitors that were mounted on the metal substrate were abraded in parallel or substantially in parallel with the side surfaces to provide the dimensions thereof in the width direction be about ½ and to expose the cross sections of the capacitors. Presence and absence of the cracks on the cross sections thereof were checked by a metallurgical microscope. The number of samples on which the cracks were generated relative to the total number of samples is indicated in Table 1.

TABLE 1

| t2 − t1 (μm) | LOAD APPLIED AT TIME OF MOUNTING (N) 43N |
|---|---|
| −6 | 409/1000 |
| −3 | 192/1000 |
| −1 | 79/1000 |
| 0 | 24/1000 |
| 0.2 | 1/1000 |
| 0.5 | 0/1000 |
| 1 | 0/1000 |
| 2 | 0/1000 |
| 3 | 0/1000 |
| 6 | 0/1000 |
| 10 | 0/1000 |
| 15 | 0/1000 |
| 17 | 0/1000 |

A via hole electrode connection test was performed as described below.

The capacitors were incorporated in a component-incorporated substrate, and then electronic component-connecting via holes were formed by a laser. On the component-incorporated substrate incorporating therein the capacitors, the side surfaces of the capacitors incorporated in the component-incorporated substrate were abraded in parallel or substantially in parallel with the side surfaces to expose cross sections thereof at positions at which the dimensional positions of the electronic component-connecting via holes at about ½ of diameters thereof were exposed. The cross sections were observed by a microscope at a magnification of about 3000-fold and whether or not the via holes and the outer electrodes were completely connected on connection portions between the via holes and the outer electrodes was checked. When the via holes and the outer electrodes were completely connected on the connection portions between the via holes and the outer electrodes, the corresponding sample was considered to be a preferable sample. When the via holes and the outer electrodes were not completely connected on the connection portions between the via holes and the outer electrodes, the corresponding sample was considered to be a defective sample. The result thereof is indicated in the following Table 2.

TABLE 2

| $t2 - t1$ (μm) | NUMBER OF DEFECTIVE SAMPLES/ TOTAL NUMBER OF SAMPLES |
|---|---|
| −6 | 0/1000 |
| −3 | 0/1000 |
| −1 | 0/1000 |
| 0 | 0/1000 |
| 0.2 | 0/1000 |
| 0.5 | 0/1000 |
| 1 | 0/1000 |
| 2 | 0/1000 |
| 3 | 0/1000 |
| 6 | 0/1000 |
| 10 | 0/1000 |
| 15 | 0/1000 |
| 17 | 28/1000 |

EXPERIMENTAL EXAMPLE 2

Six thousand capacitors including substantially the same configuration and features as that of the capacitor 2 according to the third preferred embodiment were produced under the following conditions, according to the manufacturing method described according to the first preferred embodiment.
Features of the manufactured capacitors:
Dimension of each capacitor: L×W×T=1.000 mm×0.600 mm×0.220 mm
Ceramic material: $BaTiO_3$
Capacitance: 1 μF
Rated voltage: 6.3 V
Features of each outer electrode:
Base electrode layer: Ni
Thin film electrode layer: multilayer body of NiCr sputtered layer/NiCu sputtered layer
Plated layer: Cu-plated layer
Thickness of base electrode layer (center portion): 6 μm
Thickness of thin film electrode layer (center portion): 0.3 μm (0.15 μm per layer)
Thickness of plated layer (center portion): 10 μm
t4−t3: as indicated in Table 3.
The difference t4−t3 between the heights t1 and t2 was measured as described below.

First, the side surfaces of each capacitor were abraded in parallel or substantially in parallel with the side surfaces to provide the dimension of the capacitor in the width direction of about ¼ and the cross section thereof was exposed. The cross section was observed by a microscope and the heights of the outer electrodes were measured. Then, t4−t3 was calculated while an average value of the measured height of the second to fifth outer electrodes 22 to 25 indicated by t4 and an average value of the measured height of the first and sixth outer electrodes 21 and 26 indicated by t3.

Also in the experimental example 2, a mount impact test was performed that was substantially the same as the mount impact test described above with respect to the experimental example 1. The result is indicated in Table 3.

TABLE 3

| $t4 - t3$ (μm) | LOAD APPLIED AT TIME OF MOUNTING 43N |
|---|---|
| −6 | 411/1000 |
| −3 | 146/1000 |
| −1 | 88/1000 |
| 0 | 31/1000 |
| 0.2 | 2/1000 |
| 0.5 | 0/1000 |
| 1 | 0/1000 |
| 2 | 0/1000 |
| 3 | 0/1000 |
| 6 | 0/1000 |
| 10 | 0/1000 |
| 15 | 0/1000 |
| 17 | 0/1000 |

Also in the experimental example 2, a via hole electrode connection test was performed that was substantially the same as the via hole electrode connection test described above with respect to the experimental example 1. The result is indicated in Table 4.

TABLE 4

| $t4 - t3$ (μm) | NUMBER OF DEFECTIVE SAMPLES/ TOTAL NUMBER OF SAMPLES |
|---|---|
| −6 | 0/1000 |
| −3 | 0/1000 |
| −1 | 0/1000 |
| 0 | 0/1000 |
| 0.2 | 0/1000 |
| 0.5 | 0/1000 |
| 1 | 0/1000 |
| 2 | 0/1000 |
| 3 | 0/1000 |
| 6 | 0/1000 |
| 10 | 0/1000 |
| 15 | 0/1000 |
| 17 | 19/1000 |

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A capacitor comprising:
a capacitor main body including first and second main surfaces extending along a lengthwise direction and a width direction, first and second side surfaces extending along the lengthwise direction and a height direction, and first and second end surfaces extending along the width direction and the height direction;

a plurality of inner electrodes that are located in the capacitor main body and exposed at each of the first and second side surfaces; and an outer electrode that extends over the first and second main surfaces from exposed portions of the inner electrodes on the first side surface and exposed portions of the inner electrodes on the second side surface; wherein the plurality of inner electrodes includes:

a first inner electrode; and a second inner electrode opposing the first inner electrode in the height direction;

the first inner electrode is spaced away from the first and second end surfaces of the capacitor main body and includes:

a first opposing portion which opposes the second inner electrode;

first and second lead out portions which are connected to the first opposing portion and which are each located on the first side surface; and third and fourth lead out portions which are connected to the first opposing portion and which are each located on the second side surface;

the second inner electrode includes:

a second opposing portion which opposes the first opposing portion;

a fifth lead out portion which is connected to the second opposing portion and located on the first side surface; and a sixth lead out portion which is connected to the second opposing portion and located on the second side surface;

the outer electrode includes:

a first outer electrode which covers an exposed portion of the first lead out portion on the first side surface and an exposed portion of the third lead out portion on the second side surface and encircles the first side surface, the first main surface, the second side surface, and the second main surface;

a second outer electrode which covers an exposed portion of the second lead out portion on the first side surface and an exposed portion of the fourth lead out portion on the second side surface and encircles the first side surface, the first main surface, the second side surface, and the second main surface; and a third outer electrode which covers an exposed portion of the fifth lead out portion on the first side surface and an exposed portion of the sixth lead out portion on the second side surface and encircles the first side surface, the first main surface, the second side surface, and the second main surface; and an outermost layer of the outer electrode includes a Cu-plated layer.

2. The capacitor according to claim 1, wherein:

the first outer electrode covers first and second ridge line portions defined by the first and second main surfaces and the first end surface and third and fourth ridge line portions defined by the first and second side surfaces and the first end surface; and the second outer electrode covers fifth and sixth ridge line portions defined by the first and second main surfaces and the second end surface and seventh and eighth ridge line portions defined by the first and second side surfaces and the second end surface.

3. The capacitor according to claim 2, wherein:

the first outer electrode extends to the first end surface and does not entirely cover the first end surface; and the second outer electrode extends to the second end surface and does not entirely cover the second end surface.

4. The capacitor according to claim 2, wherein:

a thickness t1 of a portion of the third outer electrode, which is provided on the first main surface, is smaller than a thickness t2 of portions of the first and second outer electrodes, which are provided on the first main surface; and a thickness t1 of a portion of the third outer electrode, which is provided on the second main surface, is smaller than a thickness t2 of portions of the first and second outer electrodes, which are provided on the second main surface.

5. The capacitor according to claim 4, wherein:

a difference between the thickness t1 of the portion of the third outer electrode, which is provided on the first or second main surface, and the thickness t2 of the portions of the first and second outer electrodes, which are provided on the first or second main surface, is between about 0.5 μm and about 15 μm.

6. The capacitor according to claim 1, wherein a dimension of the capacitor in the height direction is smaller than a dimension of the capacitor in the width direction.

7. The capacitor according to claim 6, wherein the dimension of the capacitor in the height direction is equal to or larger than about ⅕ of the dimension of the capacitor in the width direction.

8. The capacitor according to claim 1, wherein the capacitor main body includes a dielectric ceramic.

9. The capacitor according to claim 1, further comprising a plurality of via hole electrodes electrically connected to the outer electrode.

10. The capacitor according to claim 9, wherein the plurality of via hole electrodes electrically connect the outer electrode to a wiring on the substrate.

11. The capacitor according to claim 9, wherein the via holes are formed by a laser.

12. The capacitor according to claim 1, further wherein the outer electrode includes base electrode layers covered by the Cu-plated layer.

13. The capacitor according to claim 1, further comprising conductive resin layers provided between the base electrode layers and the Cu-plated layer.

14. A capacitor comprising:

a capacitor main body including first and second main surfaces extending along a lengthwise direction and a width direction, first and second side surfaces extending along the lengthwise direction and a height direction, and first and second end surfaces extending along the width direction and the height direction;

a plurality of inner electrodes that are located in the capacitor main body and exposed at each of the first and second side surfaces; and an outer electrode that extends over the first and second main surfaces from exposed portions of the inner electrodes on the first side surface and exposed portions of the inner electrodes on the second side surface; wherein the plurality of inner electrodes includes:

a first inner electrode; and a second inner electrode opposing the first inner electrode in the height direction;

the first inner electrode includes:

a first opposing portion which opposes the second inner electrode;

a first lead out portion which is connected to the first opposing portion and located on the first side surface; and second and third lead out portions which are connected to the first opposing portion and which are each located on the second side surface; and the first lead out portion is located between the second and third lead out portions in the lengthwise direction;

the second inner electrode includes:

a second opposing portion which opposes the first opposing portion;

fourth and fifth lead out portions which are connected to the second opposing portion and which are each located on the first side surface; and a sixth lead out portion which is connected to the second opposing portion and located on the second side surface;

the outer electrode includes:

a first outer electrode which is provided over an exposed portion of the first lead out portion on the first side surface and each of the first and second main surfaces;

a second outer electrode which is provided over an exposed portion of the second lead out portion on the second side surface and each of the first and second main surfaces;

a third outer electrode which is provided over an exposed portion of the third lead out portion on the second side surface and each of the first and second main surfaces;

a fourth outer electrode which is provided over an exposed portion of the fourth lead out portion on the first side surface and each of the first and second main surfaces;

a fifth outer electrode which is provided over an exposed portion of the fifth lead out portion on the first side surface and each of the first and second main surfaces; and a sixth outer electrode which is provided over an exposed portion of the sixth lead out portion on the second side surface and each of the first and second main surfaces, and an outermost layer of the outer electrode includes a Cu-plated layer.

15. The capacitor according to claim 14, wherein:

the second outer electrode covers first and second ridge line portions defined by the first and second main surfaces and the first end surface and a third ridge line portion defined by the second side surface and the first end surface;

the fourth outer electrode covers the first and second ridge line portions and a fourth ridge line portion defined by the first side surface and the first end surface;

the third outer electrode covers fifth and sixth ridge line portions defined by the first and second main surfaces and the second end surface and a seventh ridge line portion defined by the second side surface and the second end surface; and the fifth outer electrode covers the fifth and sixth ridge line portions and an eighth ridge line portion defined by the first side surface and the second end surface.

16. The capacitor according to claim 15, wherein:

the second outer electrode extends to the first end surface and does not entirely cover the first end surface in a region in which the second outer electrode is formed in the width direction when seen in plan view;

the fourth outer electrode extends to the first end surface and does not entirely cover the first end surface in a region in which the fourth outer electrode is formed in the width direction when seen in plan view;

the third outer electrode extends to the second end surface and does not entirely cover the second end surface in a region in which the third outer electrode is formed in the width direction when seen in plan view; and the fifth outer electrode extends to the second end surface and does not entirely cover the second end surface in a region in which the fifth outer electrode is formed in the width direction when seen in plan view.

17. The capacitor according to claim 14, wherein:

a thickness $t3$ of portions of the first and sixth outer electrodes, which are provided on the first main surface, is smaller than a thickness $t4$ of portions of the second to fifth outer electrodes, which are provided on the first main surface; and a thickness $t3$ of portions of the first and sixth outer electrodes, which are provided on the second main surface, is smaller than a thickness $t4$ of portions of the second to fifth outer electrodes, which are provided on the second main surface.

18. The capacitor according to claim 17, wherein a difference between the thickness $t3$ of the portions of the first and sixth outer electrodes, which are provided on the first or second main surface, and the thickness $t4$ of the portions of the second to fifth outer electrodes, which are provided on the first or second main surface, is between about 0.5 μm and about 15 μm.

* * * * *